United States Patent Office  
3,256,426  
Patented June 14, 1966

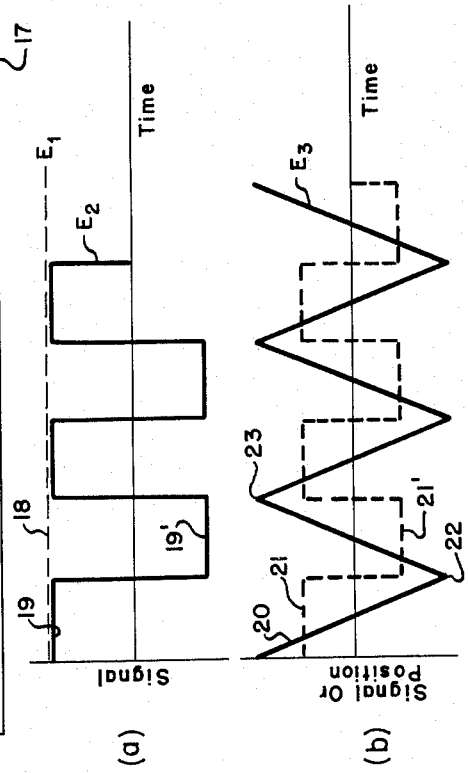
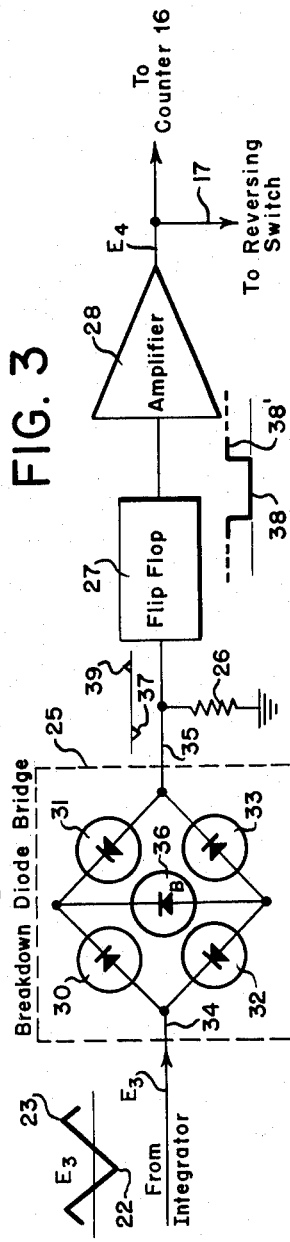

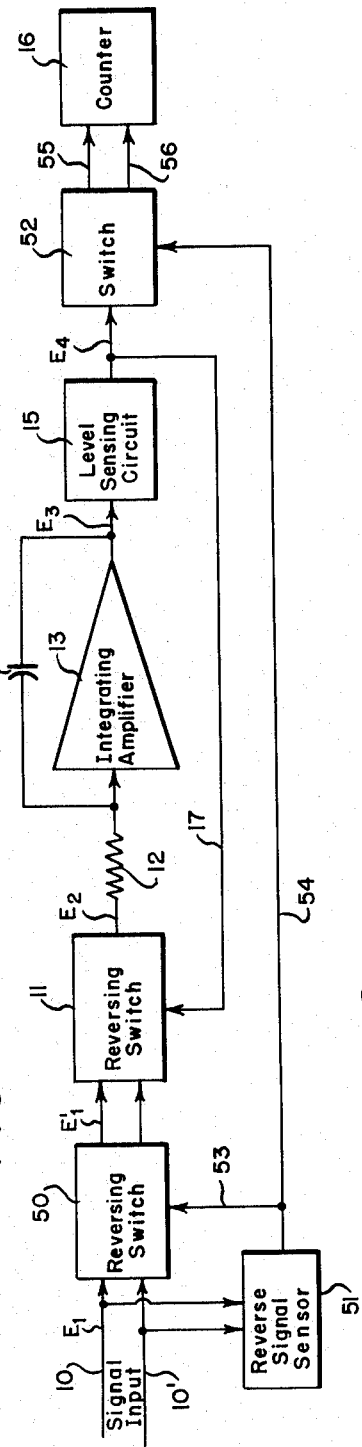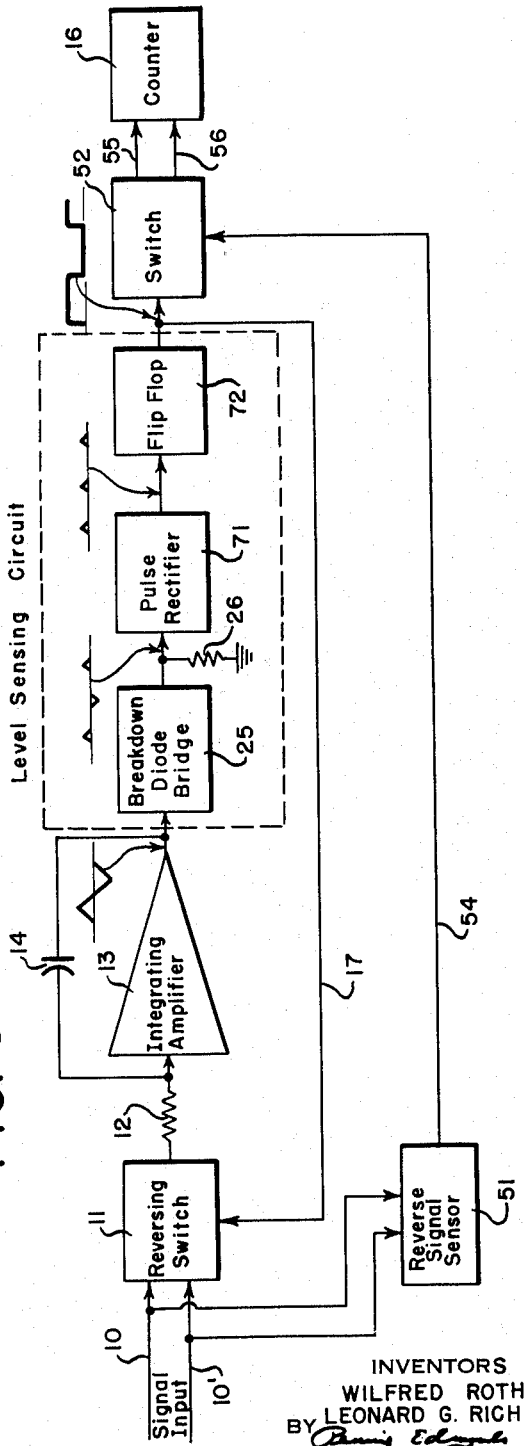

3,256,426  
INTEGRATING TOTALIZER  
Wilfred Roth, 58 Brainard Road, West Hartford, Conn., and Leonard G. Rich, West Hartford, Conn.; said Rich assignor to said Roth  
Filed June 5, 1962, Ser. No. 200,247  
4 Claims. (Cl. 235—183)

This invention relates to integrating totalizers, and in particular to such totalizers providing the integral with respect to time of an electrical signal.

Totalizers are often employed to measure total flow of a quantity over an extended period of time. Common examples are watthour meters, gas meters, fluid flow meters, etc. In many instances the rate of the quantity to be totalized is represented by a D.-C. analog signal whose magnitude is proportional to the rate and whose polarity is determined by the direction. For example, Roth U.S. Patent No. 2,865,201 discloses a mass flowmeter yielding a D.-C. output signal corresponding to the rate of mass flow of a fluid therethrough. With appropriate phase detection, the polarity of the output signal indicates the direction of fluid flow.

In certain applications it is desirable to be able to totalize to a high degree of accuracy. Thus in measuring total mass flow an accuracy of a small fraction of 1% is often advantageous.

The present invention is directed to a totalizer capable of a high degree of accuracy. While particularly designed and adapted for totalizing mass flow, it may be used to totalize other quantities where a corresponding accuracy is sought.

Totalizers are known in which a D.-C. signal is repeatedly integrated to a predetermined value, and the number of integrations counted. Usually the repeated integrations are made with the aid of an integrating capacitor. If a single integrating capacitor is employed, it must be quickly discharged between successive integrations. The period of time required for the discharge introduces an inherent cumulative error in the totalized output. Also, since the capacitor is always charged in the same direction, dielectric absorption introduces an error dependent on the past history of the capacitor. This is aggravated by the short discharge period required. Further, the discharge current must be large, with resultant heating and magnetic effects which tend to distort the mechanical structure of the capacitor, thereby reducing the accuracy substantially. Switching large currents at high speed is also difficult.

Operational integrating amplifiers are often used for accurate integration. Such integrators commonly display a certain amount of thermal drift and zero offset, that is, some output is developed when the input is zero. Offset tends to vary as the amplifier drifts and commonly produces an error in one direction. Thus the error tends to accumulate with time.

A similar system has been proposed which utilizes two integrating capacitors which are alternately charged and discharged. Such a system, while avoiding some of the above problems, does not eliminate errors due to dielectric absorption and zero offset. Also, accurate matching of the components used in alternate integration is required if a high accuracy is to be obtained.

The present invention is directed to the provision of an integrating totalizer in which the foregoing sources of error are largely or completely eliminated, yielding a totalizer capable of a high degree of accuracy.

In accordance with the invention, an integrating circuit is employed which produces an integrated output varying in one direction for a D.-C. input thereto of one polarity, and in the opposite direction for an input thereto of the other polarity. The D.-C. signal to be totalized is supplied to the integrating circuit through a polarity reversing switch. Means are provided for determining when the integrated output of the integrating circuit reaches a predetermined value or level in either direction, and yielding corresponding output signals. These output signals are used to reverse the polarity reversing switch at each output signal occurrence. The output signals are also counted to give the desired total.

In this manner a single integrating circuit employing a single integrating capacitor suffices, since the integrating capacitor charges first in one direction until it reaches a predetermined value and then starts charging in the opposite direction due to the polarity reversal of the input to the integrator. Thus problems associated with rapid discharge of the capacitor are completely avoided. Also, any errors due to offset or drift of the integrating circuit will largely cancel, and become only a second order effect.

Preferably the determination of when the integrated output reaches a predetermined value in either direction is accomplished by the same means, so that matching of separate reference levels and maintenance thereof over extended periods of time are avoided.

In some applications the D.-C. signal representing the quantity to be totalized may reverse in polarity, corresponding to a reversal of flow, etc. To take care of such applications, the integrating totalizer of the invention employs a polarity sensing circuit responsive to the D.-C. signal to be totalized, and this circuit acts to reverse the direction of counting of the output signals from the integrator.

The invention will be described in connection with specific embodiments thereof wherein additional features will in part be pointed out and in part be obvious to those skilled in the art.

In the drawings:

FIG. 1 shows a block diagram of an integrating totalizer in accordance with the invention;

FIG. 2 is an explanatory diagram illustrating the operation of the circuit of FIG. 1;

FIG. 3 is a partially schematic block diagram of a level detector usable in the circuit of FIG. 1;

FIG. 6 is a block diagram of an integrating totalizer similar to FIG. 1, with provision for signal inputs which change in polarity;

FIG. 8 is a block diagram of a modification of the circuit of FIG. 6.

Figure 4:
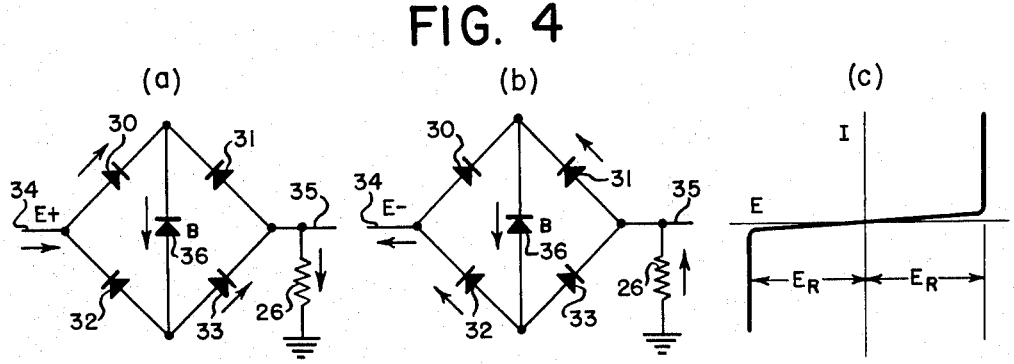
FIG. 4 illustrates the operation of a portion of the circuit of FIG. 3.

Referring to FIG. 1, an integrating totalizer is shown including signal input leads 10, 10', reversing switch 11, an operational integrator 12–14, a level sensing circuit 15, and a counter 16.

The operational integrator includes an input resistor 12, a stable high gain amplifier 13, and a feedback capacitor 14. When a D.-C. signal $E_2$ is applied thereto, the voltage on capacitor 14 builds up and represents the time integration of the input signal. The amplifier is designed to accept input signals of either polarity, and produce an integrated output $E_3$ which changes in opposite directions for opposite polarities of the input $E_2$. Such operational integrators are well known in the computer field and further description thereof is unnecessary.

The level sensing circuit 15 may be any suitable arrangement for determining when the integrated signal $E_3$ reaches a predetermined value or level in either direction. For example, it may contain fixed positive and negative reference voltages which are compared with the level of signal $E_3$ and yield an output $E_4$ whenever $E_3$ reaches one or the other of the fixed levels. FIG. 3 described hereinafter shows a particular level determining circuit which employs a break-down diode for establishing the reference levels, the arrangement being such that a single break-down diode establishes the level in either polarity.

The output $E_4$ of the level sensing circuit is supplied to a counter 16 so that the number of integrations may be counted to yield the total over a long period of time. The output $E_4$ is also supplied through line 17 to the reversing switch 11, to actuate the switch to its opposite position after each integration to a reference level.

Assuming that the polarity of the input signal $E_1$ on lines 10, 10' remains the same for several actuations of switch 11, the capacitor 14 will charge in one direction to a maximum potential of one polarity, whereupon switch 11 will reverse and the capacitor will charge in the opposite direction until it reaches a maximum potential of opposite polarity, at which level switch 11 will again reverse. The constant reversal of signal polarity input to the integrator, causing alternate charging of the capacitor to alternate peak values of opposite polarity, overcomes the problem of capacitor dielectric absorption, and those associated with rapid discharge or short-circuit of a capacitor.

Referring to FIG. 2(a), the input D.-C. signal $E_1$ is assumed, for purposes of illustration, to be constant and of positive polarity as shown by line 18. That is, line 10 has a constant positive potential with respect to line 10'. Line 19 illustrates the corresponding signal $E_2$ from switch 11 to the integrator 12–14. FIG. 2(b) shows the output $E_3$ of the integrator by line 20, and the position of reversing switch 11 by dotted line 21.

Initially the input $E_2$ to the integrator is positive, assuming that the reversing switch is in a position to provide that polarity. Thus the integrated output $E_3$ changes linearly with time in one direction, here assumed to be in the negative direction, until it reaches the negative limit 22 determined by the level sensing circuit 15. Then switch 11 is actuated to reverse the polarity of $E_1$ as applied to the integrator, as shown at 21', thereby reversing the polarity of $E_2$ as shown at 19'. When $E_2$ reverses in polarity, the integrator output $E_3$ changes linearly with time in the opposite direction until it reaches the positive limit 23. Thereupon switch 11 again reverses and the operation repeats.

Each time the integrated signal $E_3$ reaches its positive or negative limit, counter 16 is actuated. Accordingly, over a period of time the counter gives the total number of integrations between the two limits, and hence the total integrated value of the input signal $E_1$.

Figure 7:
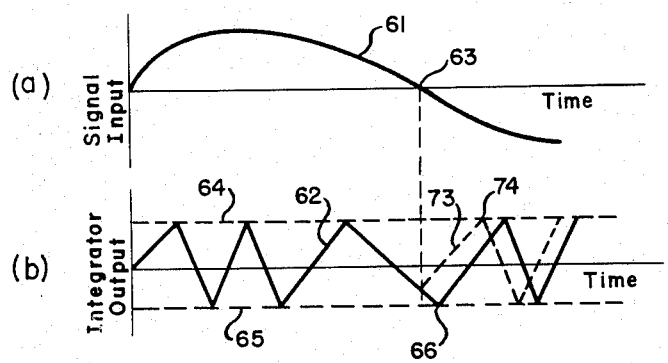
FIG. 7 is an explanatory diagram illustrating the operation of the circuits of FIGS. 6 and 8.

If the input signal $E_1$ varies in magnitude, the time required for the integrated output $E_3$ to change from one limit to the other will likewise change. Thus, if $E_1$ increases from the value represented by line 18, the time required for $E_3$ to change to the negative limit 22, and from that to the positive limit 23, etc., will be less, and the count in counter 16 will increase more rapidly. If $E_1$ is below line 18, $E_3$ will change more slowly between its limits, and counter 16 will count more slowly. This is shown in FIG. 7 which will be described later.

FIG. 3 shows a level sensing circuit which may be employed at 15 in FIG. 1. It comprises a bridge circuit 25 including a breakdown diode 36, a load resistor 26, a bistable multivibrator or flip-flop circuit 27, and an amplifier 28.

The breakdown diode bridge includes four semiconductor diodes 30, 31, 32, 33, poled as shown. Thus diodes 30, 31 are in series between the input line 34 and the output line 35, but oppositely poled. Diodes 32, 33 are similarly in series between the input and output lines and oppositely poled with respect to each other. They are also oppositely poled with respect to diodes 30, 31. A breakdown diode 36, such as a "Zener" diode, is employed to establish the integration limits. It is connected across the bridge diagonal, with its cathode connected to the junction of the cathodes of diodes 30 and 31, and its anode connected to the junction of the anodes of diodes 32 and 33. The breakdown diode 36 functions to provide a unidirectional path of high resistance for potentials below its breakdown potential, and of low resistance above breakdown. It is generally equivalent to a battery in series with an ordinary diode, with the battery voltage equal to the breakdown potential. Operation of the bridge is described in detail below.

The overall functioning of the bridge is to permit substantial conduction therethrough only for input potentials which exceed a predetermined value of either polarity. During conduction an IR drop potential of corresponding polarity appears across resistor 26, and triggers flip-flop circuit 27 to produce an output which is amplified by amplifier 28 and supplied to the counter 16 and reversing switch 11 (FIG. 1).

Waveforms are shown at selected points in FIG. 3 to illustrate the operation. An input signal $E_3$ in line 34 is assumed to be like 20 in FIG. 2(b). When the negative limit 22 is reached, diode 36 breaks down and allows current to flow through resistor 26, thereby initiating a negative pulse 37. This triggers flip-flop 27 to one of its stable states, producing a corresponding output as shown at 38. Output 38 is amplified and switches reversing switch 11 to the position shown at 21' in FIG. 2(b). The integrated signal then starts changing in the positive direction, breakdown diode 36 becomes non-conductive, and pulse 37 terminates.

When the positive limit 23 is reached, diode 36 again conducts, initiating a positive pulse 39 across resistor 26. This triggers flip-flop 27 to its opposite state, yielding an output as shown at 38'. This reverses switch 11, terminating pulse 39, and the operation repeats.

FIG. 4 illustrates the detailed operation of the breakdown diode bridge. FIG. 4(a) shows by arrows the direction of current flow through diodes 30 and 33 in the forward direction, and breakdown diode 36 in the reverse direction, when the potential on input line 34 is positive with respect to ground. This current will flow through load resistor 26 to ground. Diodes 31 and 32 will not conduct for a potential of such polarity, thereby preventing the breakdown diode from conducting in the forward direction. When E+ exceeds the breakdown potential of the breakdown diode 36, a sharp increase in current occurs, thereby producing a substantial voltage drop across resistor 26 and making line 35 sufficiently positive to trigger flip-flop 27.

FIG. 4(b) illustrates the direction of current flow when the potential on input line 34 is negative with respect to ground. In this case current flows from ground through resistor 26, and diode 31 in the forward direction, breakdown diode 36 in the reverse direction, and diode 32 in the forward direction to input line 34. When E− exceeds in value the breakdown potential of diode 36, the increased current through resistor 26 will make line 35 sufficiently negative to trigger flip-flop 27 to its other state.

FIG. 4(c) shows how the effective reference potential $E_R$, due to the breakdown diode, controls the current I flowing through the bridge and resistor 26 as a function of potential E on line 34. When the potential E is equal to or greater than $E_R$ in either direction, a large current is produced. The current flow below breakdown is normally very small.

Inasmuch as the breakdown diode operates in exactly the same manner in establishing the reference potential for both polarities of the integrated signal, problems of balancing encountered with separate reference sources are avoided.

Figure 5:
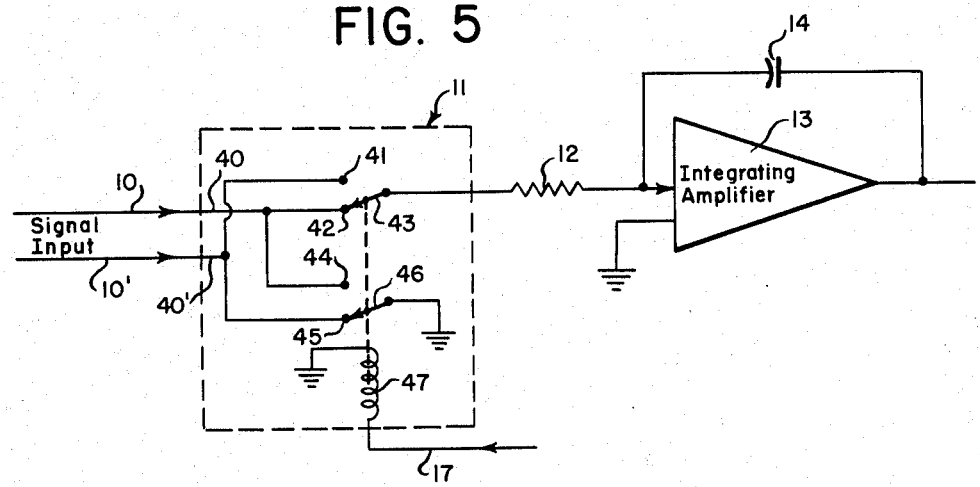
FIG. 5 is a schematic diagram of a reversing switch usable in the circuit of FIG. 1.

FIG. 5 shows a reversing switch circuit that can be used for switch 11 of FIG. 1. The switch shown is a double-pole double-throw relay. Input line 10 is connected to switch contacts 42, 44 and input line 10' is connected to switch contacts 41, 45. With the ganged switch arms 43, 46 in the position shown, input line 10 is connected to resistor 12 of the integrator, and line 10' is grounded. When arms 43, 46 are moved to their other positions, line 10 is grounded and line 10' connected to resistor 12. An ungrounded or "floating" input is assumed to be present in lines 10, 10', as will be understood by those skilled in the art.

The relay 11 can be spring-biased, or polarized, etc., depending upon the type of output produced by the level sensing circuit 15. If the level sensing circuit produces outputs of only one polarity, say positive, spaced by periods of zero output potential, then a spring-biased relay may be used. It reverses from its biased state when a positive output is received by actuating coil 47 from the level sensing circuit. If the level sensing circuit is designed to provide successive positive and negative outputs with respect to ground, then relay 11 can be polarized to reverse depending on the polarity of current passing through coil 47.

The parameters involved in the arrangement of FIG. 1 may be selected to meet the requirements of the particular application. Thus amplification may be employed to raise the input signal to a convenient level for integration, and the integration time constant and the reference levels selected so that one integration between limits represents a desired quantum for totalizing. Fast switching is desirable at switch 11, so that the integration time lost in switching is small compared to an integration period. For relatively constant values of input signal, slight changes in calibration suffice to reduce any switching error to a second order effect. While solenoid-operated relays have been found satisfactory in practice, if still faster switching is desired electronic switching circuits can be employed.

A high quality capacitor 14 and stable resistor 12 are desirable for high accuracy, and they may be placed in an oven to guard against extensive thermal drifts. Even so, some thermal drift and zero offset in integration may occur. Since such zero offset slightly hastens the integration in one direction between the predetermined limits, and slightly slows the integration in the opposite direction, the effects largely cancel and can be shown mathematically to result in only an overall second order effect. In consequence, accuracies of the order of 0.01% have been obtainable in practice.

FIG. 6 shows a modification of the circuit of FIG. 1 adapted for use with input signals whose polarity may reverse to indicate flow in the opposite direction, etc. Inserted between reversing switch 11 and input line 10, 10' is a second reversing switch 50. A reverse-flow signal sensor 51, having input lines connected to lines 10, 10', produces an output signal when the polarity of the signal input reverses. The output signal in line 53 is used to actuate the second reversing switch 50. Since switch 50 reverses upon reversal of input signal polarity, the polarity of the signal $E_1'$ to switch 11 remains unchanged.

A switch 52 is connected between the output of the level sensing circuit 15 and the counter 16 to control the direction of counting. Switch 52 is controlled by the output of the polarity sensor 51 in line 54, and delivers the output of the level sensing circuit 15 to one or the other of lines 55, 56. The counter 16 is arranged to count up for signals received through, say, line 55, and count down for signals in line 56. Suitable counter arrangements are known in the art, and they may be mechanical or electronic counters as meets the requirements of a particular application. One type of counter commonly available has a pair of electromagnets actuable to drive a toothed wheel one count per actuation in respectively opposite directions.

FIG. 7(a) shows a hypothetical signal input 61 in lines 10, 10' of FIG. 6 as a function of time. FIG. 7(d) shows an output 62 from integrater 12–14 for that signal. To the left of point 63 the input signal is of positive polarity, and the integrated signal 62 varies in opposite directions between limits 64 and 65, due to the action of the level sensing circuit 15 and reversing switch 11, as explained above. The time required to go from one limit to the other depends on the magnitude of the input signal, as is apparent.

At point 63 the input signal 61 changes polarity, but the then-existing direction of integration continues, due to the reversal of switch 50, until the integrated signal reaches the corresponding limit. As here shown, the integration is in the negative direction at the time the input signal changes polarity, and continues until the lower limit is reached at point 66. Reversal of switch 11 then causes the integration to change direction.

At point 63, switch 52 will be actuated to reverse the direction of counting, as explained above. It may be noted that a slight error can exist as the input signal reverses polarity. This error is negligible in most practical applications. If not, it can be reduced by using more rapid integration between the limits, since the error will not exceed one such integration. That is, the error will not exceed one count, and the quantity represented by a count can be made sufficiently small so that the error is negligible.

A sensitive polarity-responsive relay is desirable for sensor 51, since it may be required to operate near zero amplitude, or D.-C. amplification may be employed with a less sensitive relay. Slight errors in switching when the input signal is small may be accepted, since there will be little contribution to the overall total.

In the apparatus of FIG. 6 the operation of the level sensing circuit and the control of switch 11 are assumed to be such that switch 11 is always switched to one particular position when the positive limit of integration is reached, and to the other position when the negative limit is reached. This would be true for the particular level sensing circuit shown in FIG. 3, and the switch arrangement shown in FIG. 5. Accordingly, the additional reversing switch 50 is employed so that the signal applied to switch 11 is always of the same polarity. It is also possible to arrange the control of switch 11 so that input signals of either polarity can be applied thereto. One such arrangement is shown in FIG. 8.

Referring to FIG. 8, the level sensing circuit contains a breakdown diode bridge 25 like that of FIG. 3. The output positive and negative pulses from the bridge are then rectified in 71 to yield output pulses of one polarity regardless of input pulse polarity, as indicated. Flipflop 72 is a bistable multivibrator designed to trigger from one state to the other successively in response to successive input pulses of the same polarity, for example, an Eccles-Jordan circuit. Thus reversing switch 11 is switched to its opposite position upon each occurrence of a limit signal from bridge 25, whether the signal is positive or negative.

With this type of control of reversing switch 11, it is unnecessary to employ an additional reversing switch to take care of changes in input signal polarity. Thus, in FIG. 8 the input signal is applied directly to switch 11.

In FIG. 7 dotted line 73 is explanatory of the operation of FIG. 8. While the input signal is of one polarity, to the left of point 63, operation is the same as in FIG. 6. When the input signal reverses polarity at point 63, the reversing switch 11 remains unchanged, and, accordingly, the signal potential to the integrator 12–14 reverses. Thus, the direction of the integrated output reverses until the upper limit is reached at point 74. At this point, a limit signal from bridge 25 will operate to reverse switch 11, as described above. Operation will then continue for the negative portion of the input signal in the same manner as in FIG. 6.

In many applications, either the arrangement of FIG. 6 or FIG. 8 can be employed without significant difference in the overall result. However, in some particular applications one may be preferable to the other.

The invention has been described in connection with several specific embodiments thereof. It will be understood that many modifications thereof may be made within the spirit and scope of the invention, and many changes made in the specific circuitry as meets the requirements of a particular application.

We claim:

1. An electronic integrating totalizer for a D.-C. signal representing a quantity to be totalized which comprises
   (a) an electronic integrating circuit including an amplifier and a feedback integrating capacitor for producing an integrated output across said capacitor varying in one direction for a D.-C. input to the amplifier of one polarity and in the opposite direction for an input thereto of the other polarity,
   (b) means for supplying a D.-C. signal to be totalized to the electronic integrating circuit through a polarity reversing switch,
   (c) electronic means for determining when the output of said electronic integrating circuit reaches predetermined values in each direction and yielding corresponding output signals,
   (d) means responsive to said output signals for reversing said switch on each occurrence thereof,
   (e) means for counting said output signals,
   (f) and a polarity sensing circuit responsive to the D.-C. signal to be totalized for reversing the count of said output signals upon reversal of polarity of said D.-C. signal.

2. An electronic integrating totalizer for a D.-C. signal representing a quantity to be totalized which comprises
   (a) an electronic integrating circuit including an amplifier and a feedback integrating capacitor for producing an integrated output across said capacitor varying in one direction for a D.-C. input to the amplifier of one polarity and in the opposite direction for an input thereto of the other polarity,
   (b) means for supplying a D.-C. signal to be totalized to the electronic integrating circuit through a polarity reversing switch,
   (c) an electronic level sensing circuit supplied with the integrated output of the integrating circuit for producing an output whenever the integrated output exceeds a predetermined limit level in either direction,
   (d) means responsive to the output of the level sensing circuit for reversing said switch on each occurrence thereof,
   (e) whereby an input signal of one polarity is repeatedly integrated between two limits,
   (f) counting means for counting the number of integrations between said limits,
   (g) and a polarity sensing circuit responsive to the polarity of said D.-C. signal for reversing said counting means upon reversal of signal polarity.

3. An electronic integrating totalizer in accordance with claim 2 including
   (a) means for actuating said reversing switch to one predetermined position thereof in response to an output from the level sensing circuit corresponding to one limit level and to the other position thereof in response to an output corresponding to the other limit level,
   (b) and a second reversing switch for supplying the said D.-C. signal to the first-mentioned reversing switch,
   (c) said polarity sensing circuit being connected to reverse the second reversing switch upon reversal of said D.C. signal polarity.

4. An electronic integrating totalizer in accordance with claim 2 in which said electronic level sensing circuit comprises
   (a) a diode bridge having an input and output circuit connected to one diagonal thereof,
   (b) a load impedance in said output circuit,
   (c) and a breakdown diode connected across the other diagonal of the bridge,
   (d) the diodes forming the bridge being poled to pass current through the breakdown diode only in the breakdown direction thereof for inputs to the bridge of either polarity,
   (e) whereby the breakdown diode establishes the predetermined limit levels of both polarities.

References Cited by the Examiner

UNITED STATES PATENTS

| 240,678 | 4/1881 | Edison | 324—94 |
| 2,864,556 | 12/1958 | Raymond | 235—183 |
| 2,950,052 | 8/1960 | Knox | 235—183 X |
| 3,002,690 | 10/1961 | Meyer | 235—183 |
| 3,048,336 | 8/1962 | Ritzenthaler | 235—183 |
| 3,055,002 | 9/1962 | Waller | 235—183 X |
| 3,072,856 | 1/1963 | Close | 328—127 X |
| 3,161,858 | 12/1964 | Sanders et al. | 320—1 X |

MALCOLM A. MORRISON, *Primary Examiner.*

K. DOBYNS, I. KESCHNER, *Assistant Examiners.*